(12) United States Patent
Postolek

(10) Patent No.: US 10,761,412 B1
(45) Date of Patent: Sep. 1, 2020

(54) CAMERA HOLDER

(71) Applicant: Filip Postolek, Long Beach, CA (US)

(72) Inventor: Filip Postolek, Long Beach, CA (US)

( * ) Notice: Subject to any disclaimer, the term of this patent is extended or adjusted under 35 U.S.C. 154(b) by 0 days.

(21) Appl. No.: 15/807,098

(22) Filed: Nov. 8, 2017

Related U.S. Application Data

(60) Provisional application No. 62/419,261, filed on Nov. 8, 2016.

(51) Int. Cl.
| G03B 17/56 | (2006.01) |
| F16M 11/04 | (2006.01) |
| F16M 11/10 | (2006.01) |
| F16M 13/00 | (2006.01) |
| F16M 13/04 | (2006.01) |
| A45F 5/02 | (2006.01) |

(52) U.S. Cl.
CPC ........... *G03B 17/566* (2013.01); *F16M 11/04* (2013.01); *F16M 11/041* (2013.01); *F16M 11/10* (2013.01); *F16M 13/00* (2013.01); *A45F 5/02* (2013.01); *A45F 2200/0533* (2013.01); *F16M 13/04* (2013.01)

(58) Field of Classification Search
CPC ....................................................... G03B 17/56
USPC .............................................. 396/419; 2/459
See application file for complete search history.

(56) References Cited

U.S. PATENT DOCUMENTS

| 634,014 | A | * | 10/1899 | Malloy | A44B 11/04 |
| | | | | | 24/198 |
| 4,786,078 | A | * | 11/1988 | Schreier | B60R 22/024 |
| | | | | | 280/808 |
| D313,343 | S | * | 1/1991 | Sachs | D11/218 |
| 5,014,892 | A | * | 5/1991 | Copeland | A45F 5/02 |
| | | | | | 224/242 |
| 5,375,749 | A | * | 12/1994 | Oliva | A45F 5/02 |
| | | | | | 224/242 |
| D357,435 | S | * | 4/1995 | Cook | D11/200 |
| D359,710 | S | * | 6/1995 | Chinni | D11/218 |
| 6,298,528 | B1 | * | 10/2001 | Workman | A45C 13/30 |
| | | | | | 24/265 CD |
| 6,354,034 | B1 | * | 3/2002 | Norris, Sr. | F41C 23/02 |
| | | | | | 42/85 |
| 7,013,497 | B1 | * | 3/2006 | Grant | A44B 11/006 |
| | | | | | 2/459 |
| 7,654,027 | B1 | * | 2/2010 | Grover | F16B 21/165 |
| | | | | | 24/573.11 |

(Continued)

FOREIGN PATENT DOCUMENTS

CN 203241686 U 10/2013

OTHER PUBLICATIONS

"DDR Black Plastic Double D Ring," National Webbing, requested from www.nationalwebbing.com/products/DDR-Black-Plastic-Double-D-Ring.html>- , 2017, 2 Pages (Year: 2017).*

(Continued)

*Primary Examiner* — Clayton E. LaBalle
*Assistant Examiner* — Kevin C Butler
(74) *Attorney, Agent, or Firm* — King & Schickli, PLLC

(57) ABSTRACT

An apparatus for holding a camera in connection with a strap of a bag is provided. The apparatus includes a camera holder comprising a ring adapted for connecting to the strap. The holder includes an aperture adapted for receiving a fastener for connecting the camera to the holder.

21 Claims, 3 Drawing Sheets

(56) References Cited

U.S. PATENT DOCUMENTS

| | | | |
|---|---|---|---|
| 7,654,028 B1 * | 2/2010 | Grover | F41C 23/02 |
| | | | 224/150 |
| D631,787 S * | 2/2011 | Grimm | D11/218 |
| 8,292,521 B2 * | 10/2012 | Chamberlayne | A45F 3/14 |
| | | | 396/423 |
| D673,880 S * | 1/2013 | Boothby | D11/218 |
| 8,411,199 B2 | 4/2013 | Corticelli | |
| 8,579,523 B2 * | 11/2013 | Xu | G03B 17/566 |
| | | | 396/423 |
| 8,678,679 B2 | 3/2014 | Xu | |
| D702,151 S * | 4/2014 | Kaneko | D11/218 |
| 8,708,583 B2 * | 4/2014 | Chamberlayne | F16M 11/041 |
| | | | 396/423 |
| 8,727,642 B1 * | 5/2014 | Tse | F16M 11/041 |
| | | | 396/419 |
| 8,807,410 B2 * | 8/2014 | Zielberg | A45C 11/08 |
| | | | 224/197 |
| 9,081,256 B2 * | 7/2015 | Dering | F16M 11/041 |
| 9,164,363 B2 * | 10/2015 | Chiu | G03B 21/145 |
| D748,531 S * | 2/2016 | Paik | D11/218 |
| 9,285,658 B2 * | 3/2016 | Xu | G03B 17/563 |
| 9,339,101 B2 * | 5/2016 | Sung | A45F 5/00 |
| 9,380,854 B2 * | 7/2016 | Hamra | A45F 5/00 |
| 9,383,631 B2 | 7/2016 | Jackson et al. | |
| 9,560,898 B2 * | 2/2017 | Hortnagl | A44B 11/2592 |
| D813,089 S * | 3/2018 | Frost | D11/218 |
| D816,545 S * | 5/2018 | Kelleghan | D11/218 |
| 10,085,545 B2 * | 10/2018 | Tran | A45F 5/02 |
| D843,887 S * | 3/2019 | Frost | D11/218 |
| 2005/0184117 A1 * | 8/2005 | Brown | A45C 13/30 |
| | | | 224/623 |
| 2012/0048900 A1 * | 3/2012 | Wong | A45C 3/001 |
| | | | 224/257 |
| 2012/0302928 A1 * | 11/2012 | Roubal | A61H 11/02 |
| | | | 601/5 |
| 2013/0101280 A1 * | 4/2013 | Xu | G03B 17/563 |
| | | | 396/423 |
| 2014/0226962 A1 * | 8/2014 | Henry | G03B 17/561 |
| | | | 396/423 |
| 2014/0259551 A1 * | 9/2014 | Egbert | A45F 3/14 |
| | | | 24/302 |
| 2015/0370149 A1 * | 12/2015 | Jackson | G03B 17/561 |
| | | | 396/419 |
| 2016/0209734 A1 * | 7/2016 | Jackson | G03B 17/561 |
| 2016/0278487 A1 * | 9/2016 | Postolek | A44B 11/2573 |

OTHER PUBLICATIONS

AP037 Heavy Duty D-Ring, American Plastics, requested from www.americanplastics.com/catalog.asp?cat=47982163&p=1&c=4>, 2017, 1 Page (Year: 2017).*

* cited by examiner

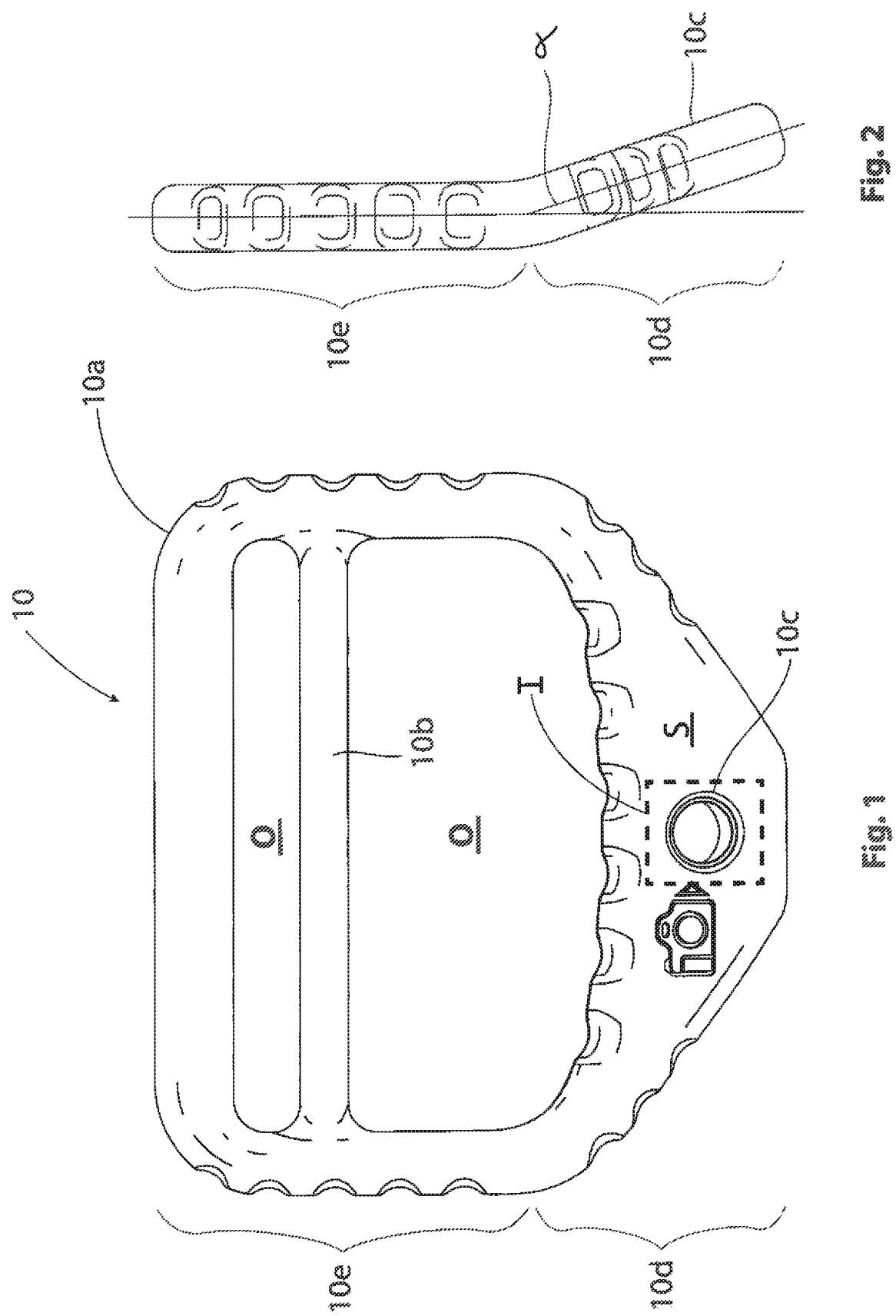

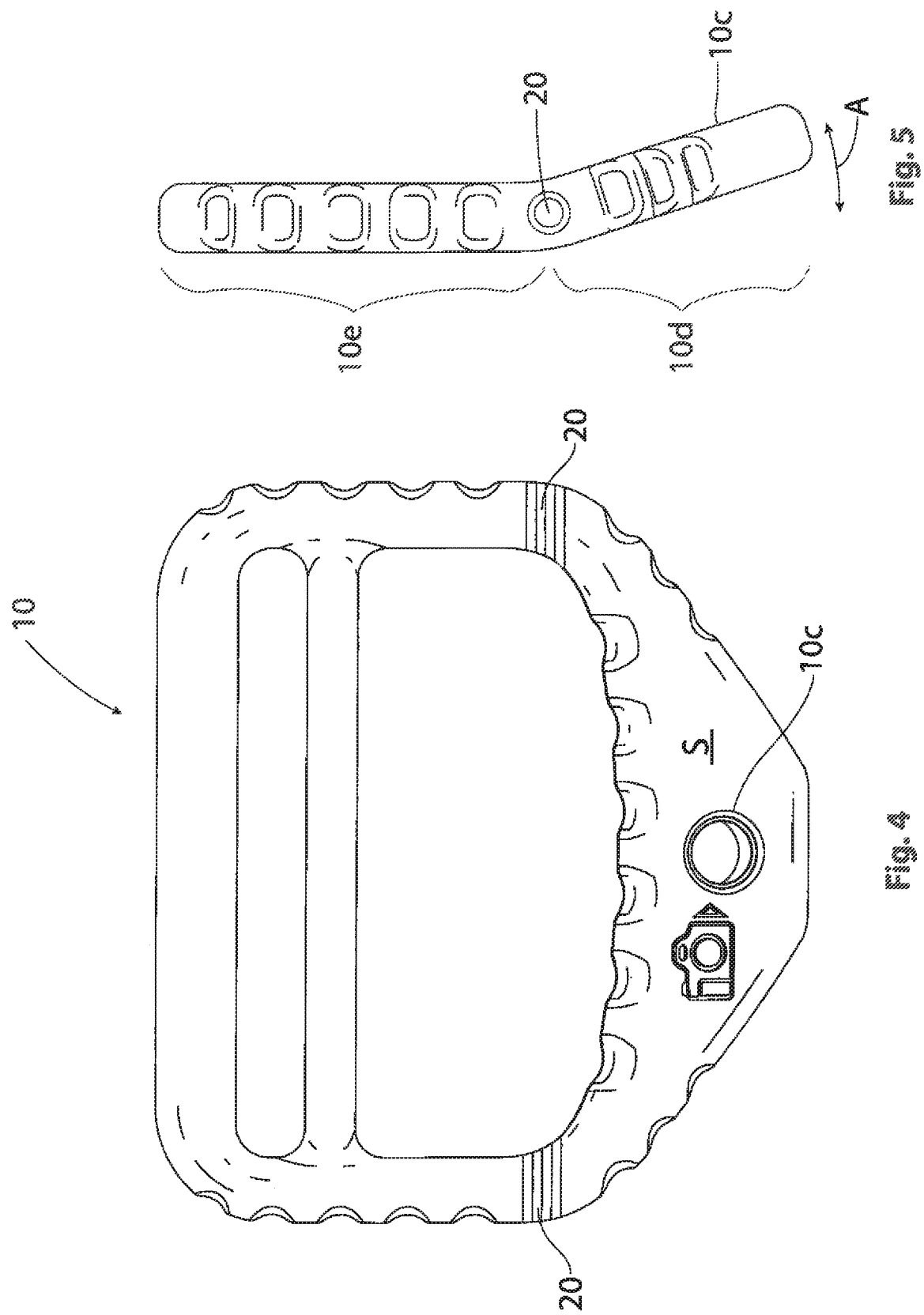

CAMERA HOLDER

This application claims the benefit of U.S. Provisional Patent Application Ser. No. 62/419,261, the disclosure of which is incorporated herein by reference.

TECHNICAL FIELD

This disclosure relates generally to cameras and, more particularly, to a wearable apparatus with a convenient place for holding a camera for ready use by a photographer

BACKGROUND

Photographers require ready access to their cameras in order to capture the perfect shot. Often, cameras are provided with neck straps for this purpose. These straps can get in the way, especially when the photographer is also wearing an item of baggage, such as a camera bag, and in extreme situations might interfere with the intended use of the camera.

Accordingly, it would be desirable to provide a wearable apparatus with a convenient place for holding a camera for ready use by a photographer.

SUMMARY

According to one aspect of the disclosure, an apparatus for holding a camera having a fastener in connection with a strap of a bag is provided. The apparatus includes a ring including an aperture adapted for receiving the fastener for connecting with the camera, and a cross member forming a pair of openings within the ring for receiving the strap.

In one embodiment, the ring comprises a D-shaped ring. The cross member may have a rounded outer surface for engaging the strap. The ring may include a first portion having the aperture and a second portion, wherein the first and second portions extend at an angle relative to each other. The first and second portions may also be connected by a hinge. The ring may include an anti-slip surface adjacent to the first aperture for engaging the camera. The aperture may be internally threaded for engaging the fastener.

According to a further aspect of the disclosure, an assembly includes a strap and a camera holder adapted for connecting to the strap, the holder including an aperture adapted for receiving a fastener for connecting the camera to the holder.

In one embodiment, the camera holder comprises a ring, such as a D-shaped ring. The camera holder may include a cross member forming a pair of openings for receiving the strap. The camera holder includes a first portion having the aperture and a second portion, wherein the first and second portions extend at an angle relative to each other. The first and second portions may be connected by a hinge. The camera holder may include an anti-slip or frictionally enhanced surface adjacent the aperture for engaging the camera.

Still a further aspect of the disclosure pertains to an apparatus for supporting a camera from a user. The apparatus comprises a strap adapted for being worn by the user. The apparatus further comprises a camera holder comprising a ring, the ring including a cross member forming a pair of openings for receiving the strap and a second aperture. Still further, the apparatus comprises a threaded fastener for positioning in the second aperture for connecting the camera to the camera holder.

In one embodiment, the camera holder comprises a D-shaped ring. The axes of the apertures are oriented at <90 degrees to each other, depending on the relative tilt of the corresponding portions of the holder. The camera holder may include a first portion having the first aperture and a second portion, wherein the first and second portions extend at an acute angle relative to each other. The camera holder may include a first portion having the aperture and a second portion, wherein the first and second portions are connected by a hinge. The camera holder may include an anti-slip surface adjacent the first aperture for engaging the camera.

BRIEF DESCRIPTION OF THE DRAWING FIGURES

The accompanying drawing figures incorporated herein and forming a part of the specification, illustrate several aspects of the disclosed embodiments and, together with the description, serve to explain certain principles thereof. In the drawing figures:

FIG. 1 is a top view of a holder for holding a camera in connection with a strap on a bag;

FIG. 2 is a side view of the holder of FIG. 1;

FIGS. 4 and 5 illustrate an alternate embodiment.

Reference will now be made in detail to the present preferred embodiments a camera holder, examples of which are illustrated in the accompanying drawing figures.

DETAILED DESCRIPTION

Figure 3A:
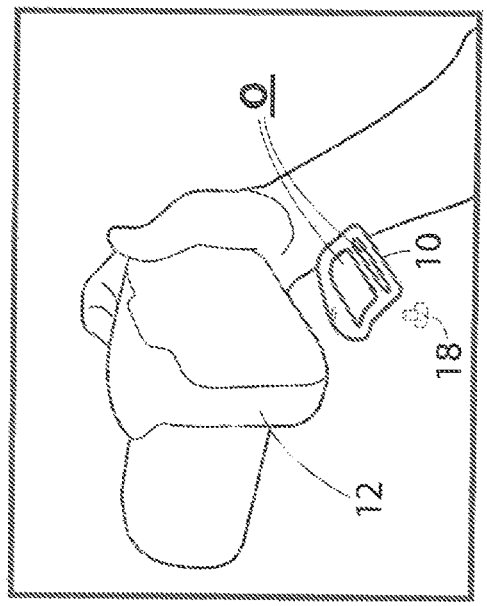
FIG. 3A is an exploded view of the holder of FIGS. 3.
Figure 3:
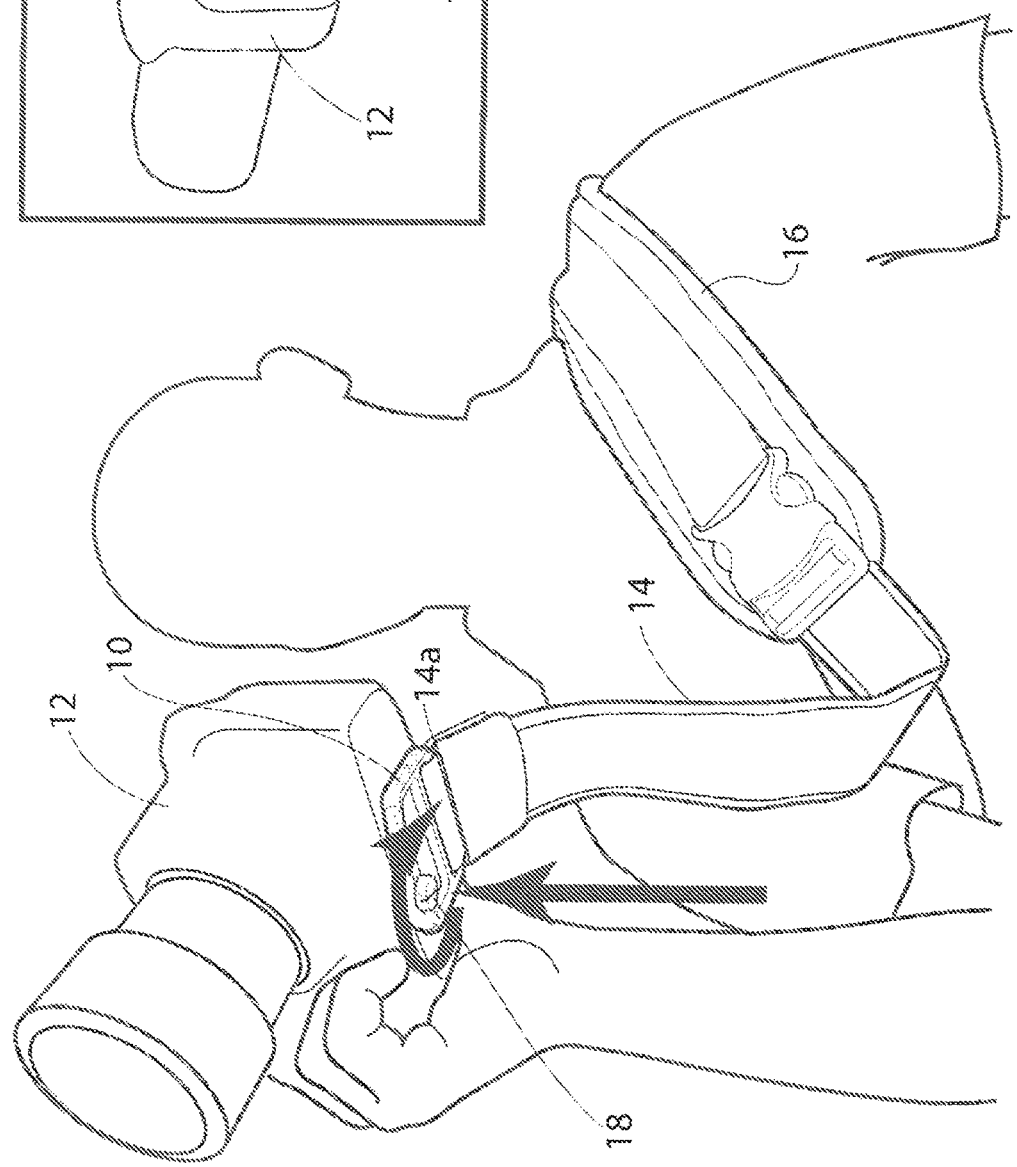
FIG. 3 is a view illustrating one possible manner of use of the camera holder.

With reference now to FIGS. 1, 2, and 3, a holder 10 for use in connection with a camera 12 is disclosed. The holder 10 may in one embodiment comprise a ring-shaped structure having an outer perimeter 10a and a cross member 10b, one of which may interact with an associated strap 14. This strap 14 may be an auxiliary webbing extending from a main shoulder or chest strap 16, which may optionally be connected to a bag, such as a camera bag (not shown)). It can be appreciated from FIG. 1 that the holder 10 is generally in the form of a D-shape in a top plan view, and thus is sometimes termed a "D-ring," but the holder 10 may take other shapes or forms without limitation.

The cross member 10b may be located off-center, and provide first and second apertures, such as openings O, for receiving a strap distal end 14a. The arrangement may be done in a manner that allows for easy tightening or loosening to lengthen or shorten the distance between the strap distal end and proximal end (or the distance may be fixed by sewing the webbing, which may comprise a strong fabric woven as a flat strip). The cross member 10b and the corresponding portion of the outer perimeter 10a may also provide a generally rounded outer surface for allowing for the traversal of the strap 14 through the openings O for purposes of tightening or loosening (if desired; the strap 14 may also simply surround an adjacent portion of the outer perimeter 10a).

According to one aspect of the disclosure, and with reference to FIGS. 3 and 3A, the holder 10 includes another opening, such as aperture 10c for connecting with the camera 12, Specifically, the aperture 10c may be adapted for receiving a fastener, such as a screw or bolt 18. The bolt 18 may be adapted for threading into a conventional threaded opening in the camera 12 for receiving a support, such as a tripod, and thus the aperture 10c may be similarly threaded (e.g., a threaded hole of ¼-20 spec). The ring of the holder 10 may thus bound both the openings O and the aperture 10c.

Thus, as shown in FIG. 3A, the bolt 18 with an oversized head (e.g., a thumbscrew) may be used to secure the holder 10 to the camera 12. This in turn connects the camera 12 to the strap 14 when connected to the holder 10, and such that it projects rearwardly from a lower or bottom side of the camera, so as to not interfere with the user's ability to grasp the sides or contact the top of the camera. The aperture 10c and the openings O have axes that intersect, at an angle of less than 90 degrees subject to the angular positioning of the portion of the holder 10, as discussed below in more detail; note imaginary axes X and Y in FIG. 2, which form an angle of approximately 20 degrees).

Consequently, as can be understood from FIG. 3, the camera 12 may be allowed to dangle or depend from the shoulder strap 16 when not in use. However, the camera 12 is positioned for ready access for taking a photo when desired, The fastener or bolt 18 can also be easily removed to allow for storage of the camera 12 in the bag associated with the shoulder strap 16 when not in use.

As can be understood from FIG. 2, it is an optional feature to make the holder 10 such that the strap 14 does not create any interference when the camera 12 is held up to the user's face for taking a photo. This may be done by tilting a portion of the holder 10. Specifically, a portion 10d of the holder 10 including the aperture 10c may be oriented at an angle α to a remainder 10e the holder. The angle α is shown as being acute and, more specifically, approximately 20 degrees. Consequently, when the bottom surface of the camera 12 is aligned with a corresponding surface S of the holder 10 in use, the remainder of the holder 10 and the associated strap 14 does not interfere with the viewing or operation of a rear face of the camera.

FIGS. 4 and 4A further illustrate that a hinge 20 may be provided between the first and second portions 10d, 10e. This hinge 20 that allows for the relative angle between portion 10d and remainder 10e (which are thus two separate, interconnected pieces) to be selectively adjusted (note arrow A), thereby allowing the holder 10 to accommodate different desired orientations of the camera 12 (e.g., 0-90 degrees to ensure that an associated webbing or strap 14 does not interfere with the visibility of the photographer).

The holder 10 may be fabricated of metal, plastic, or combinations thereof, and as noted above may be multiple pieces or a single unitary piece of material with the aperture 10c and openings O formed therein. The fastener, such as bolt 18, is typically made of metal as well, but could be hardened plastic, and may be provided with holder 10 or may be provided as part of the camera 12 or another device associated therewith (such as a tripod). While the strap 14 would typically be a woven polymer material, such as nylon, it could also be formed of other non-woven materials, such as for example rubber, leather, plastic, or any combination thereof.

The holder 10 may also be provided with surface modifications (e.g., scallops 30) to enhance frictional engagement or gripping. For instance, the surface S adjacent to the opening 10c may be roughened or textured to create an anti-slip surface that helps maintain camera 12 in position once secured by fastener, such as bolt 18. The surface modification may also be completed by co-molding a base of the holder 10 with an insert I, as indicated in FIG. 1. The insert I could have, for instance, upwardly projecting rubber fingers for engaging the underside surface of the camera 12, and thus establish a frictional engagement that helps to prevent undesirable swiveling. Alternatively, a bearing could be provided in opening 10c for allowing the fastener to swivel when connected to the camera 12, or else the bolt 18 could simply be loosened to allow for such movement, if desired.

As shown in FIG. 3, a buckle K may also be provided for releasably connecting the strap 14 associated with the holder 10 with the chest or shoulder strap 16. The buckle K may be conventional, or the one described in U.S. Patent Application Publication No. US 2016/0278487, the disclosure of which is incorporated herein by reference.

The foregoing description has been presented for purposes of illustration. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An apparatus for holding a camera having a fastener in connection with a strap of a bag, comprising:
    a D-shaped ring including an opening for receiving the strap, the opening bounded by opposed sides, a cross member, and a curved portion opposite the cross member, the curved portion including an aperture adapted for receiving and retaining the fastener for connecting with the camera.

2. The apparatus of claim 1, wherein the cross member divides the opening into first and second openings within the D-shaped ring.

3. The apparatus of claim 1, wherein a forward portion of the ring including the curved portion with the aperture extends at an acute angle relative to a rearward portion including the opening, wherein a first vertical axis passing through the aperture intersects a second vertical axis passing through the opening.

4. The apparatus of claim 1, wherein the aperture is internally threaded for engaging the fastener.

5. The apparatus of claim 1, wherein the strap comprises webbing.

6. An apparatus for supporting a camera from a user, comprising:
    a strap adapted for being worn over a shoulder of the user, the strap having an auxiliary webbing; and
    a camera holder adapted for connecting to the auxiliary webbing, the holder including an aperture adapted for receiving a fastener for connecting the camera to the holder.

7. The apparatus of claim 6, wherein the camera holder comprises a D-shaped ring.

8. The apparatus of claim 6, wherein the camera holder includes a cross member forming a pair of openings for receiving the strap.

9. The apparatus of claim 6, wherein the camera holder includes a first portion having the aperture and a second portion, wherein the first and second portions extend at an angle relative to each other.

10. The apparatus of claim 6, wherein a locking buckle connects the auxiliary webbing to the strap.

11. The apparatus of claim 6, wherein the camera holder includes an anti-slip surface adjacent the aperture for engaging the camera.

12. An apparatus for supporting a camera from a user, comprising:
    a single strap adapted for being worn by the user;

a camera holder comprising a ring adapted for connecting to the single strap, the ring bounding a first aperture for receiving the single strap and a second aperture adapted for receiving and retaining a threaded fastener for connecting the camera to the camera holder.

13. The apparatus of claim 12, wherein the camera holder comprises a D-shaped ring.

14. The apparatus of claim 12, further including a third aperture bounded by the ring for receiving the single strap.

15. The apparatus of claim 12, wherein the camera holder includes an anti-slip surface adjacent the first aperture for engaging the camera.

16. An apparatus for holding a camera having a fastener in connection with a strap of a bag, comprising:
   a ring including a first portion having an aperture adapted for receiving the fastener for connecting with the camera, and a second portion having an opening within the ring for receiving the strap, wherein the first and second portions are connected by a hinge.

17. An apparatus for holding a camera having a fastener in connection with a strap of a bag, comprising:
   a ring including an aperture adapted for receiving the fastener for connecting with the camera, an opening within the ring for receiving the strap, and an anti-slip surface adjacent to the aperture for engaging the camera.

18. An apparatus for holding a camera having a fastener in connection with a strap of a bag, comprising:
   a ring including an aperture adapted for receiving the fastener for connecting with the camera, and an opening within the ring for receiving the strap, wherein the aperture is adapted for engaging and retaining the fastener of the camera.

19. An apparatus for holding a camera having a fastener in connection with a strap of a bag, comprising:
   a D-shaped ring including an aperture adapted for receiving the fastener for connecting with the camera, and an opening within the D-shaped ring for receiving the strap, wherein the D-shaped ring includes surface modifications to enhance frictional engagement or gripping of the D-shaped ring.

20. An apparatus for connecting a camera having a threaded hole of a ¼-20 specification with a strap of a bag, comprising:
   a threaded fastener adapted for threading into the threaded hole of the camera; and
   a camera holder including a first portion having an aperture adapted for engaging and retaining the threaded fastener, and a second portion adapted for receiving the strap.

21. The apparatus of claim 20, wherein the camera holder is tilted such that a first plane aligned with the first portion extends at an acute angle relative to a second plane aligned with the second portion.

\* \* \* \* \*